(12) United States Patent
Finkelstein

(10) Patent No.: US 11,012,184 B1
(45) Date of Patent: May 18, 2021

(54) ACTIVE TAPS AND DISTRIBUTED GAIN ARCHITECTURE IN A CABLE NETWORK

(71) Applicant: COX COMMUNICATIONS, INC., Atlanta, GA (US)

(72) Inventor: Jeffrey L. Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 16/831,594

(22) Filed: Mar. 26, 2020

(51) Int. Cl.
*H04L 1/20* (2006.01)
*H04L 1/00* (2006.01)
*H04L 12/28* (2006.01)

(52) U.S. Cl.
CPC ............. *H04L 1/0033* (2013.01); *H04L 1/20* (2013.01); *H04L 12/2801* (2013.01)

(58) Field of Classification Search
CPC ....... H03F 3/195; H03F 3/24; H03H 17/0273; H04L 1/0033; H04L 1/20; H04L 12/2801
USPC .......................................................... 375/295
See application file for complete search history.

(56) References Cited

U.S. PATENT DOCUMENTS

| | | | |
|---|---|---|---|
| 2014/0355989 A1* | 12/2014 | Finkelstein | H04L 12/2896 398/72 |
| 2015/0029869 A1* | 1/2015 | Wolcott | H04B 3/487 370/242 |
| 2019/0020430 A1* | 1/2019 | Finkelstein | H04L 67/306 |
| 2019/0020521 A1* | 1/2019 | Finkelstein | H04B 3/04 |

* cited by examiner

*Primary Examiner* — Ted M Wang
(74) *Attorney, Agent, or Firm* — Eversheds Sutherland (US) LLP

(57) ABSTRACT

Technologies are directed to active taps and distributed gain architectures in a cable network. In some embodiments, an active tap includes multiple ports, where at least one of the multiple ports can receive radio-frequency (RF) signals from a customer premises equipment (CPE) and/or can transmit RF signals to the CPE. The active tap also can include a switch module and a controller device functionally coupled to the switch module. The controller device can monitor one or several performance metrics defining respective signal attributed. The controller device also can control the operation of the tap device based on a magnitude of a performance metric. The active tap also includes a cable modem that can report magnitudes of performance metric(s) to a network device or a user device. A distributed gain architecture can include any combination of passive taps and active taps functionally coupled to a fiber node in the cable network.

20 Claims, 7 Drawing Sheets

ACTIVE TAPS AND DISTRIBUTED GAIN ARCHITECTURE IN A CABLE NETWORK

BACKGROUND

A variety of service providers, such as cable providers and satellite providers, may connect user devices to one or more networks, such as cable networks and/or the Internet. A provider may provide cable and/or Internet access to customer premises via devices, such as headend devices, which may include a computer system and/or database required for provisioning of content. The headend may include a cable modem termination system (CMTS), which can send and receive cable modem signals on a cable network to provide Internet services to cable subscribers. However, the customer premises may experience issues, such as congestion, speed losses, pricing spikes, service interruptions, and the like that can degrade the user experience.

Some of those issues can be compounded by the need to amplify radio-frequency (RF) signals in wider frequency bands that may be used to provider richer services, increased connectivity bandwidth, and the like. Specifically, loss and non-linearities become more prevalent as a frequency band increases and, thus, the amplification of RF signals becomes more challenging. In addition, the equipment involved in the amplification becomes increasingly sophisticated, with ensuing added cost. While in some situations in which the amplification of signals can be avoided by deploying addition fiber optic segments in the cable network, the cost of deploying fiber optic and associated devices also can increase costs.

Therefore, improved technologies that remedy those challenges may be desired.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like, but not necessarily the same or identical, elements throughout.

DETAILED DESCRIPTION

Figure 1:
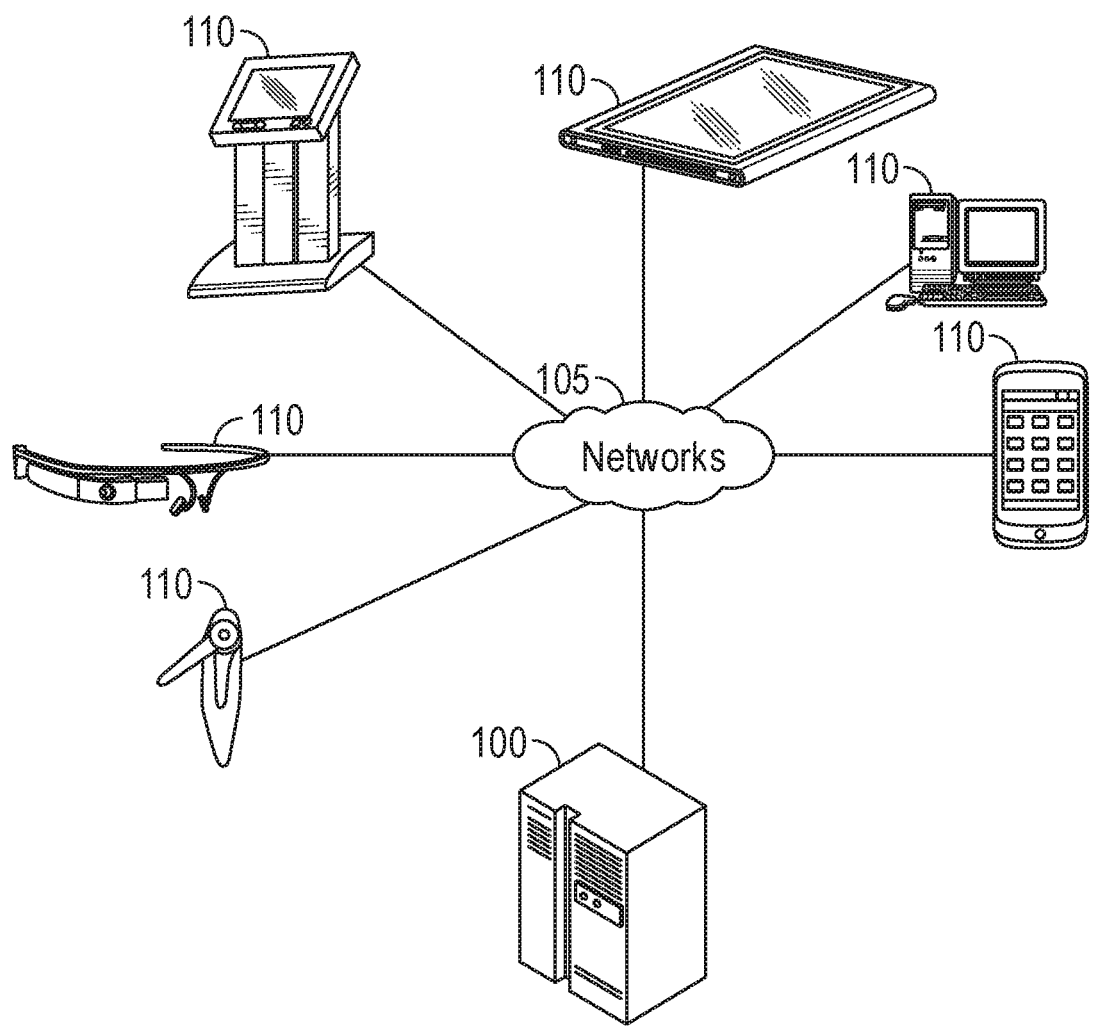
FIG. 1 presents an example of an operational environment in accordance with one or more embodiments of this disclosure.

Embodiments of the technologies disclosed herein are directed to network architectures that avoid the need for deploying amplifiers dedicated to operate on RF signal in a wide frequency band. In the disclosed network architectures, a gain module is integrated into a tap device that can be functionally coupled to customer premises equipment (CPE). As such, the amount of amplification that may be required at a gain module may be significantly reduced relative to the amount of amplification at a dedicated amplifier in a conventional network architecture. Accordingly, the network architecture disclosed herein can be referred to as distributed gain architectures.

In addition to a gain module, tap devices in accordance with aspects of this disclosure can include components that can permit monitoring and controlling the operation of the tap device in real-time. Therefore, the tap devices can be referred to as active tap devices or active taps. Those components can include, in some embodiments, a switch module, a controller device, and a cable modem. The switch module can be a solid-state switch module that can operate on RF signals within a particular frequency band (e.g., approximately 1.2 GHz, approximately 1.8 GHz, and approximately 3 GHz).

The switch module can be functionally connected to a group of tap ports in an active tap. In some configurations, each tap port in the group of active ports can be functionally coupled to CPE in a particular dwelling. The switch module can send data indicative of RF signals received at a tap port to the controller device. The switch module also can send data indicative of RF transmitted from the tap port. Such data can be sent to the controller device in nearly real-time. The controller device can measure various performance metrics using the data received from the switch module. The measurements can be performance as the data is received and, thus, can provide one or more signal attributes in nearly real-time. A performance metric can define a signal attribute. Thus, the performance metric can represent a service condition at the CPE. As an illustration, a performance metric can be one of signal-to-noise ratio (SNR.), minimum end-of-line (MER) measurements, a slope, an amplitude, ripple, spike (such as a non-linear noise distortion) measurements, absolute received power per subcarrier, error vector magnitude measurements, and the like.

The cable modem can report performance metrics to a network device (including another active tap) or a user device, or both. To that end, the cable modem can send data using proactive network maintenance (PNM) messaging in accordance with DOCSIS. DOCSIS describes telecommunications specifications that permit or otherwise facilitate the addition of high-bandwidth data transfer to a cable network. In particular, DOCSIS may enable the deployment of data-over-cable systems on a nonproprietary, multivendor, interoperable basis for bidirectional transfer of Internet Protocol (IP) traffic between a cable system headend and CPE over an all-coaxial network or an HFC network.

In addition, or in other embodiments, the active tap also can perform analog measurements. To that end, the cable modem can read analog signal and can be tuned to the analog domain. As a result, the cable modem can determine (or measure) power levels in the analog domain. Those power levels can be determined in a full-band capture manner, across the entire RF spectrum in the frequency band of operation of active tap.

The controller device also can control the operation of the active tap. To that end, in some configurations, the controller device can determine if a performance metric satisfies a threshold criterion. The threshold criterion can dictate, for example, a satisfactory range of a signal attribute. In situations in which the threshold criterion fails to be satisfied, the controller device can cause the switch module to modify RF transmitted to a CPE from a tap port of the active tap.

Other embodiments of this aspect include corresponding systems, apparatu1 and computer programs, configured to perform the actions of the methods, encoded on computer storage devices.

Particular embodiments of the subject matter described herein can be implemented so as to realize one or more of the following advantages. Improve network stability and operational The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bidirectional data flow directional data flow capabilities. The terms "path," "pathway," and "route" are used interchangeably herein.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Bluray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the li~e. Further, a non-volatile computer-readable storage medium may also include conductive-bridging random access memory (CBRAM), phase-change random access memory (PRAM), ferroelectric random access memory (FeRAM), non-volatile random-access memory (NVRAM), magnetoresistive random-access memory (MRAM), resistive random-access memory (RRAM), Silicon Oxide Nitride-Oxide-Silicon memory (SO OS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor/Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

Various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 provides an illustration of an example embodiment of the present disclosure. As is shown in FIG. 1, this particular embodiment may include one or more management computing entities 100, one or more networks 105, and one or more user devices 110. Each one of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

In various aspects, the management computing entities 100 may include various devices or portions of devices on a cable network, including cable modems, optical nodes, to s, active taps, switches, medium access control (MAC) devices, physical layer (PHY) devices, amplifiers, fiber nodes, access points (APs), and the like, variously described below. In another embodiment, such devices may include circuitry (e.g., processors and memory) and associated software instructions (e.g., computer code) to perform various functions associated with such devices (e.g., determine signals for transmission, modulate signals in accordance with one or more modulation techniques, transmit signals including packets, receive including packets, process including packets, schedule including packets, etc.). Moreover, such management computing entities 100 may perform aspects of the transmission of data over networks in accordance with various techniques as described herein.

In another embodiment, the network(s) 105 may include, but not be limited to, cable networks including hybrid fiber-coaxial networks. More broadly, the network(s) 105 may include at least portions of wireless networks or wired networks. In another embodiment, a cable network may use various sub-networks (e.g., WiFi networks, cellular networks) to perform aspects of the functionality described herein, for example, in connection with the disclosed devices (e.g., switches, taps, active taps, MAC devices, cable modem termination system (CMTS) devices, PHY devices, amplifiers, optical fiber nodes, access points1 and the like). In another embodiment, the networks 105 may use at least a portion of a fifth-generation cellular mobile communications, also referred to as 5G herein.

In another embodiment, the user devices 110 can include devices associated with a customer premises equipment (e.g., devices located in a dwelling of a user or on the person of a user). Non-limiting examples may include one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

Figure 2:
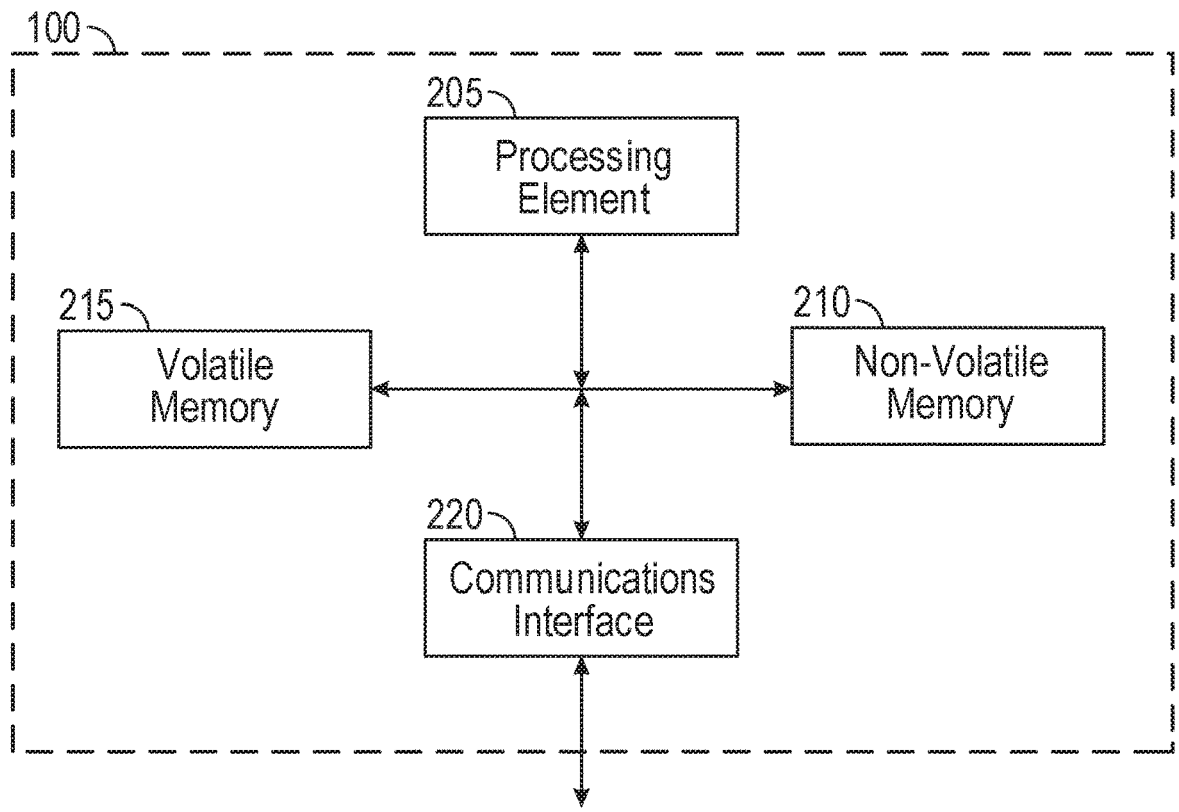
FIG. 2 presents an example of a management computing unit, in accordance with one or more embodiments of this disclosure.

FIG. 2 provides a schematic of a management computing entity 100 according to one embodiment of the present disclosure. As noted above, a management computing entity 100 may include various devices on a cable network, including switches, MAC devices, access point devices, taps, active taps, PHY devices, amplifiers, fiber nodes, and the like.

Further, the management computing entity 100 may include a content component, a processing component, and a transmitting component (not shown). In particular, the content component may serve to determine signals indicative of data (e.g., video, audio, text, data, combinations thereof, and/or the like) to be transmitted over the network. In another embodiment, the determination of the signal for transmission may be, for example, based on a user input to the device, a predetermined schedule of data transmissions on the network, changes in network conditions, and the like. In one embodiment, the signal may include that data may be encapsulated in a data frame that is configured to be sent from a device to one or more devices on the network.

In another embodiment, the processing component may serve to determine various parameters associated with the signal for transmission over the network. For example, the processing component may serve to determine various parameters for the signal a modulation scheme, a power level (a particular power level and/or code scheme), a frequency band of communication, header information associated with the signal, combinations thereof, and/or the like.

In one embodiment, the transmitting component (not shown) may serve to transmit the signal from one device to another device on the network. For example, the transmitting component may serve to prepare a transmitter (e.g., transmitter 304 (FIG. 3)) to transmit the signal over the network. For example, the transmitting component may queue the signal in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the signal.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As is shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controller devices. Further, the processing element 205 may be embodied as one or more other processing devices or circuitry. The term circuitry may refer to an entirely hardware embodiment or a combination of hardware and computer program products. Thus, the processing element 205 maybe embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or nonvolatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, DOCSIS, or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (L TE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Zigbee, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

In some configurations, one or more component of the management computing entity 100 may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, use.rs may be employees, residents, customers, and/or the like. For instance, a user may operate a user device 110 that includes one or more components that are functionally similar to those of the management computing entity 100. In some embodiments, user devices 110 may include, but not be limited to, devices associated with a customer premise equipment, as described above. In another embodiment, the user device 110 may be configured to receive data from an access point, or other similar device (e.g., at a customer premise equipment site such as a home).

In various aspects, the processing component, the transmitting component, and/or the receiving component (not shown) may be configured to operate on one or more devices (e.g., device 404 to be shown and described in connection with FIG. 4, below, which may include a CMTS, another network controller device further upstream on the network, and/or other devices further downstream on the network) may include aspects of the functionality of the management computing entity 100, as shown and described in connection with FIG. 1 and FIG. 2. In particular, the processing component, the transmitting component, and/or the receiving component may be configured to be in communication with one or more processing elements 205, memory 210, volatile memory 215, and may include a communication interface 220 (e.g., to facilitate communication between devices, for example, with various customer premise equipment such as cable modems).

Figure 3:
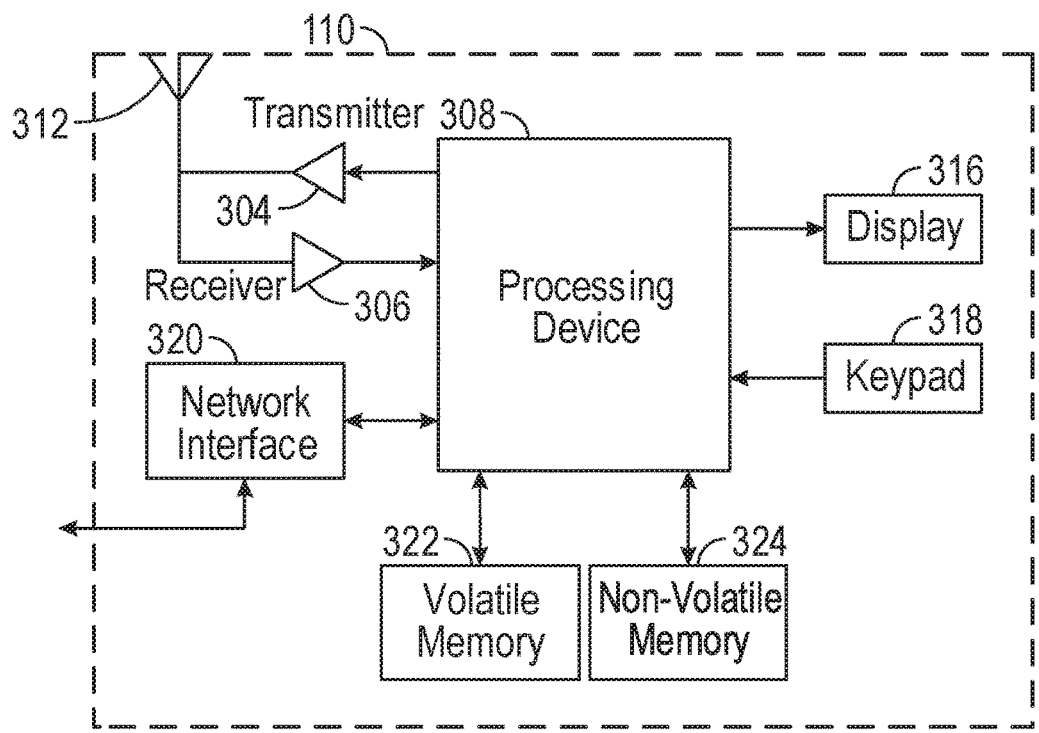
FIG. 3 presents an example of a user device, in accordance with one or more embodiments of this disclosure.

FIG. 3 provides an illustrative schematic representative of a user device 110 that can be used in conjunction with embodiments of the present disclosure. For example, the user device 110 may be used in connection with the active taps described below. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the use 10 may include location determining aspects, devices, modules, functionalities, and/or similar words use herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's I 10 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate some functions, such as screen savers and/or sleep modes.

The user device 110 can also include volatile storage or memory 322 and/or nonvolatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, .SO OS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, YR.AM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

Figure 4:
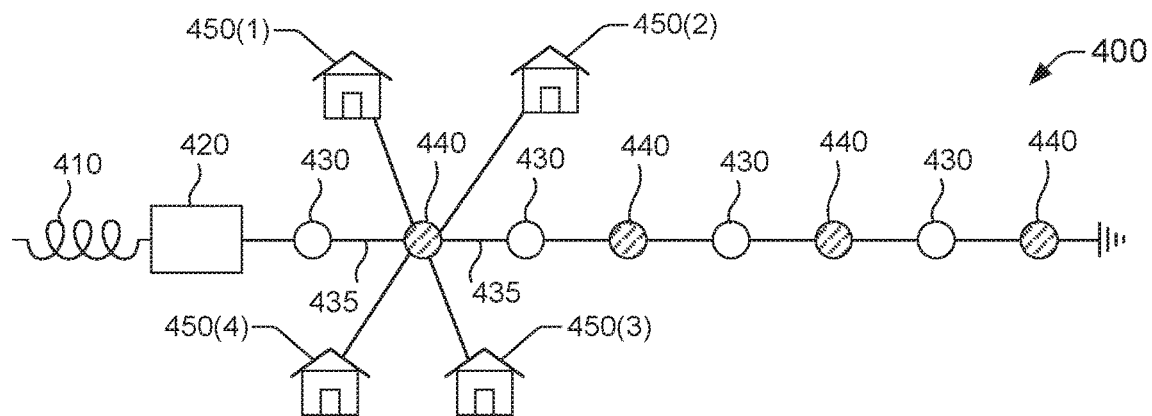
FIG. 4 presents an example of a section of a cable network that utilizes a distributed gain architecture, in accordance with one or more embodiments of this disclosure.

FIG. 4 is a schematic diagram of an example of a section of a cable network that utilizes a DGA 400, in accordance with one or more embodiments of this disclosure. The cable network can include, in some embodiments, a fiber optic network that can extend from a headend to out to a hubsite of a neighborhood and finally to a coaxial cable node. The coaxial cable node can serve 25 to 2000 households, for example.

The DGA 400 can include a network device 420 that is functionally connected to a fiber 410 that connects the network device 420 to upstream network devices (not depicted in FIG. 4). The network device 424 can include a cable modem termination system (CMTS), which also can be referred to as an access controller, a controller, or a node. In some embodiments, the network device 420 can have a converged cable access platform (CCAP) functionality. In other embodiments, the network device 424 can serve as remote physical (PHY) device, that is, a device having PHY layer functionality as is described in connection with the open systems interconnection (OSI) model.

The network device 420 also is functionally coupled to a fiber 425 and various downstream network devices. The downstream network devices include multiple passive taps 430 and multiple active taps 440. Passive taps 430 can be conventional cable taps. As is illustrated in FIG. 4, nearest-neighboring taps include a passive tap 430 and an active tap 440 and are functionally connected by distribution lines 435 (e.g., a distribution coaxial cable). Based on the configuration of a DGA, nearest-neighbor taps can be passive taps, active taps, or a combination including an active tap and a passive tap. Regardless of type, nearest-neighboring taps can be functionally connected by distribution lines.

A passive tap 430 can be functionally coupled to a group of dwellings (not depicted in FIG. 4). An active tap 440 can be functionally coupled to a group of second dwellings. In some configurations, each active tap 440 is functionally coupled to one or several dwellings. An active tap 440 can be functionally connected to a dwelling by means of a port (not depicted in FIG. 4) assembled at the active tap 440 and a drop line 445 (e.g., a drop coaxial cable). The drop line 445 connects to the port and is coupled to CPE at the dwelling. Simply as an illustration, for the sake of simplicity of explanation, an active tap 440 is depicted as being functionally coupled to a first dwelling 450(1), a second dwelling 450(2), a third dwelling 450(3), and a fourth dwelling 450(4).

Figure 5:
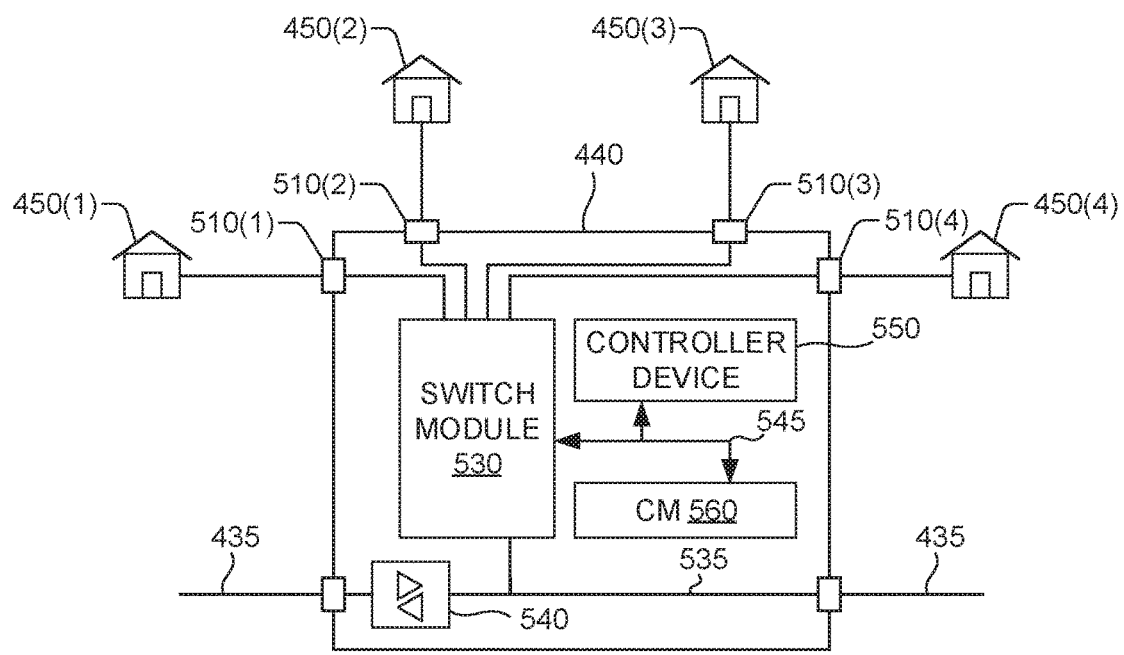
FIG. 5 presents an example of an active tap that can be used in a distributed gain architecture, in accordance with one or more embodiments of this disclosure.

A block diagram of an example of an active tap 440 is shown in FIG. 5. The active tap 440 has a housing 505 of a defined size. The defined size can be specific to the frequency band Δf of operation of the cable network containing the active tap 440. The housing 505 can be made of any suitable material. For example, the housing 505 can be made of metal or plastic, or a combination of both. Suitable metals can include, for example, aluminum, copper, silver, steel, brass, combinations thereof, and/or the like. Suitable plastics can include, for example, polyethylene terephthalate (PETE or PET), high-density polyethylene (HDPE), polyvinyl chloride (PVC), low-density polyethylene (LDPE), polypropylene (PP), combinations thereof, and/or the like. In some embodiments, the housing 505 can be rugged for environmental protection. In addition, or in other embodiments, the housing 505 may be shielded from electromagnetic interference (EMI), for example, using a Faraday cage.

The active tap 440 also includes multiple ports that can be used to receive and transmit RF signals. Specifically, the multiple ports include a first port 520(1) and a second port 520(2), each connected to the coaxial hardline 435. In one configuration, the first port 520(1) can receive downstream RF signals and can send upstream RF signals. In such a configuration, the second port 520(2) can send downstream RF signals and can receive upstream RF signals. In another configuration, the first port 520(1) send downstream RF signals and can receive upstream RF signals. In that other configuration, the second port 520(2) can receive downstream RF signals and can send upstream RF signals.

In addition, the multiple ports of the active tap 440 include other ports that can permit functionally coupling respective dwellings to the active tap 440. In one embodiment, those other ports include a first port 510(1), a second port 510(2), a third port 510(3), and a fourth port 510(4)

used to functionally connect the first dwelling 450(1), the second dwelling 450(2), the third dwelling 450(3), and the fourth dwelling 450(4), respectively.

Each one of the ports that permit functionally coupling the active tap 440 to respective dwellings is connected to a switch module 530. The switch module 530 can operate on RF signals. The RF signals can include, for example, upstream RF signals and downstream RF signals for the first dwelling 450(1), the second dwelling 450(2), the third dwelling 450(3), and the fourth dwelling 450(4). The switch module 530 can be embodied in a solid-state module including one or several types of switching devices (e.g., a PIN diode, a FET, etc.).

The switch module 530 can supply both upstream RF signals and downstream RF signals to network devices and/or other devices in the DGA 400. To that end, the switch module 530 can be functionally connected to a passthrough line 535 included in the active tap 440 and functionally coupled to coaxial hardlines 435. The switch module 530 also can receive downstream RF signals or upstream RF signals, or both, from the passthrough line 535.

A bidirectional amplifier 540 included in the active tap 440 can amplify either one or both of such signals. To that end, in some embodiments, the bidirectional amplifier 540 can be assembled on the passthrough line 535. The bidirectional amplifier 540 can amplify upstream signal or downstream signal, or both, on the passthrough line 535 based on a distance between active taps 440 in the DGA 400. Because active taps can be closely spaced, the amount of amplification can be substantially less than in conventional architectures. For example, the bidirectional amplifier 540 can provide about 15 dB instead of about 75 dB.

While not shown in FIG. 5, the active tap 440 can include a switchable diplex filter device that can switch the upstream/downstream split between 85/108, 204/258, 300/378, 396/498, 492/612, and 684/858. The switching of the diplex filter device can be accomplished by means of a management and control plane interface handled through a DOCSIS MAC Management interface.

The active tap 440 also can include a controller device 550 that can monitor tap ports that functionally couple the active tap 440 to respective dwellings. To monitor a port, the controller device 550 can receive data indicative of RF signals received at the port and/or data indicative of RF signals transmitted at the port. The data can be received from the switch module 530, by means of a bus architecture 545 that functionally couples the switch module 530 and the controller device 550. The controller device 550 can then generate one or several performance metrics using at least a portion of the received data. In some configurations, at least one of the performance metric(s) can represent a condition of a service provided at a dwelling corresponding to the monitored port. It is noted that the bus architecture 545 can provide, at least in part, control and data pathways between the controller device 550 and the switch module 530.

By using RF signals received from the switch module 530, the controller device 550 can monitor such tap ports individually. In some instances, the control device 550 monitors each one of the tap ports. In other instances, the control unit 550 monitors a particular subset of the tap ports. For example, the controller device 550 can monitor each one of the first port 510(1), the second port 510(2), the third port 510(3), and the fourth port 510(4).

The controller device 550 can implement tiered monitoring for a tap port of the active tap 440. Several tiers of monitoring can be configured in the implementation of tiered monitoring. A tier corresponds to a defined group of performance metrics. For instance, the defined group of performance metrics can include receive power, transmit power, SNR, a combination thereof, or similar. In addition, the tier has a respective satisfactory range for the magnitude of each performance metric in the defined group of performance metrics. Thus, the magnitude of a first performance metric in such a group can range from a first defined threshold to a second defined threshold; the magnitude of a second performance metric in such a group can range from a third defined threshold to a fourth defined threshold; and so forth.

In an implementation of tiered monitoring, the controller device 550 can determine a group of performance metrics based on magnitudes of respective second performance metrics. Specifically, the controller device 550 can monitor a first group of performance metrics corresponding to a first tier of monitoring. In some instances, the controller device 550 can detect that the magnitudes of a performance metric in the first group lays outside the defined range of the performance metric. In response, the controller device 550 can transition to monitoring a second group of performance metrics corresponding to a second tier of monitoring. At least one of the performance metrics in the second group can be specific to the performance metric detected as being outside an applicable range.

Tiered monitoring can serve as a diagnostic tool. For example, tiered monitoring can permit or otherwise facilitate performing root-cause analysis of an issue present in CPE functionally coupled to the active tap 440. In this way, richer status reports can be provided when an issue may be present in a customer premises equipment connected to the active tap 440. Such reports can be provided to another active tap, a network management component, and/or a user device.

The active tap 440 also can report performance metrics. To that end, the controller device 550 can cause the cable modem 560 to send data identifying a performance metric. The cable modem 560 can be functionally coupled to controller device 550 via at least a portion of the bus architecture 545. In particular, in one embodiment, the bus architecture 545 can include a peripheral component interconnect express) (PCI Express) standard, which may refer to a high-speed serial computer expansion bus standard. In addition, or in another embodiment, the bus architecture 454 can include one or a combination of PCI, PCI-X, Accelerated Graphics Port (AGP) bus standards, or any other suitable standard.

Figure 6:
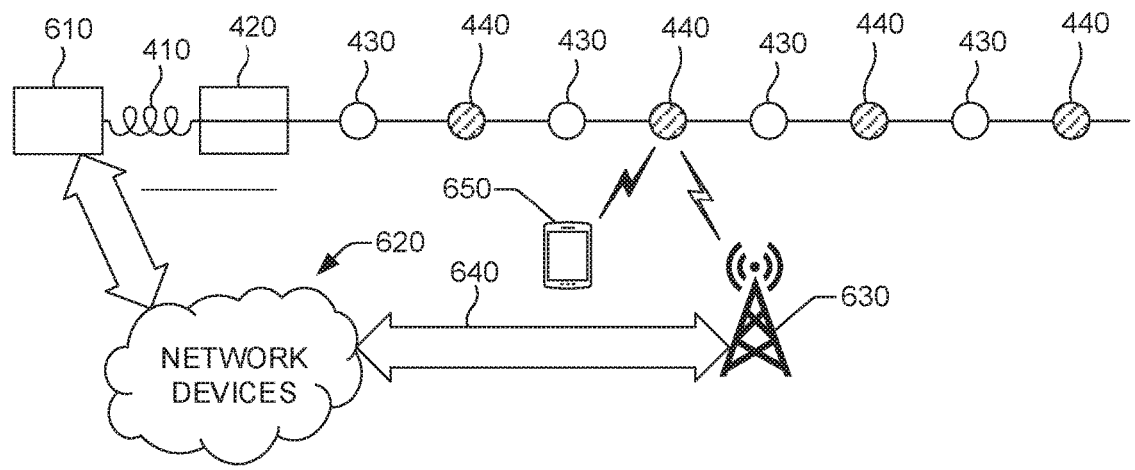
FIG. 6 presents an example of communication between an active tap in a cable network and network devices, in accordance with one or more embodiments of this disclosure.

As is illustrated in FIG. 6, in some instances, the cable modem 560 can send the data to a network device included in a headend 610 or backend devices 620 of the cable network including the active tap 440. To send the data to the network device, the cable modem 560 can use PNM messaging in accordance with DOCSIS. In other instances, the cable modem 560 can send the data wirelessly to the network device. As such, the cable modem 560 can send the data to a cellular base station 630 according to one or more radio protocols, such as 3G, LTE, LTE-A, 5G, or similar. The cellular base station 630 can send the data to the network device by means of a communication architecture 640. The communication architecture 640 can include components of a radio access network (RAN) and other devices.

Further, or in yet other instances, the cable modem 560 can send the data to a user equipment 650. The data can be sent wirelessly according to one or many radio protocols, such as Bluetooth, ZigBee, Wi-Fi, or similar. In some situations, the user equipment 650 can connect to the active tap 440 when located near the active tap 440. For instance, the UE and the active tap 440 can be paired. In response, the user equipment 650 can receive data identifying one or multiple performance metrics from the active tap 440. In addition, or as an alternative, the user equipment 650 can request specific performance metric(s) from the active tap 440. The user equipment 650 can be, for example, a mobile device (handheld or otherwise) used by a field engineer.

In some embodiments, the controller device 550 can report other information besides values of performance metrics. In one of those embodiments, upon being energized, the controller device 550 can send a notification indicating that the controller is online. Such a notification can be used, by a network device, for example, to identify the active tap 440 as being energized.

With further reference to FIG. 5, the controller unit 550 also can control the tap ports individually. To that end, the controller device 550 can cause the switch module 530 to modify an RF signal transmitted from a tap port. The controller device 550 can determine a magnitude of a modification to the RF signal based at least on respective values of one or several performance metrics corresponding to the port. In one scenario, the controller unit 550 can modify the amplitude of an RF signal transmitted from individual tap ports in order to adjust transmit power from those ports individually. Thus, gain at each one of the tap ports can be controlled individually even though that active tap 440 includes a single bidirectional amplifier 540. As an illustration, the controller device 550 can cause the switch module 530 to modify the amplitude of an RF signal transmitted from a first tap port (e.g., port 510(2)) from a first magnitude to a second magnitude, where both the first and second magnitudes are finite. Accordingly, the transmit power at the first tap port increases when the second magnitude is greater than the first magnitude, and decreases when the second magnitude is less than the first magnitude. As a result, the controller device 550 can adjust the gain at the first tap port to a defined level. In another aspect of the illustration, the controller device 550 also can cause the switch module 530 to modify the amplitude of an RF signal transmitted from a second tap port (e.g., port 510(4)) from a third magnitude to a fourth magnitude, where both the third and fourth magnitudes are finite. Accordingly, the transmit power at the second tap port increases when the fourth magnitude is greater than the third magnitude, and decreases when the fourth magnitude is less than the third magnitude.

Modifying a gain at each tap port of a group of tap ports individually can permit providing essentially the same level of signal to respective dwellings functionally coupled to the group of tap ports. Because the controller device 550 can monitor performances metrics for each of those dwellings, the controller device 550 can determine an amount of gain that is necessary in order to provide a satisfactory amount of transmit power for a dwelling connected to a tap port. The controller device 550 can then modify the gain at each tap port in the group of tap ports based on the determined amounts. For example, a large home can have significant losses because of large amounts of coaxial cable present in the home, whereas a small home may have significantly less loss that the large home. The controller device 550 can determine a first amount of gain necessary at a first tap port functionally coupled to the large home, and a second amount of gain necessary at a second tap port functionally coupled to the small home. For instance, the first amount can be equal to 20 dB and the second amount may be 10 dB. The controller device 550 can then modify respective gains at the first and second tap ports accordingly.

By measuring RF signal transmitted to a dwelling and RF signal received from the dwelling, the controller device 550 can individually modify transmit power at each tap port of the active tap 440 to achieve unity gain, for example.

The controller device 550 also can turn off one or multiple tap ports of the active tap 440. The tap port(s) can be turned off individually. To turn a tap port off, the controller device 550 can cause the switch module 530 to remove a connection to the tap port. In other words, the tap port can be switched off. As a result, the amplitude of an RF signal transmitted by the tap port is reduced from a finite magnitude to essentially zero. Because the tap port is switched off, customer premises equipment (CPE) installed within the dwelling connected to the tap port becomes disconnected from the cable network. In one example, the tap port can be the third port 510(3) and the dwelling can be the third dwelling 450(3). The CPE can include a cable modem, a set-top box, a residential gateway, a telephone, or similar.

Multiple operational conditions can cause the controller device 550 to turn off a tap port. In some situations, the controller device 550 can detect receive power that exceeds a defined threshold amount at the tap port. The receive power can be received from CPE functionally coupled to the tap port. In response, the controller device 550 can turn off the tap port. In other situations, a performance metric defining an attribute of an RF signal received from such CPE can exceed a defined threshold value. In response, the controller device 550 also can turn off the tap port. In yet other situations, the controller device 550 can detect unauthorized port usage of the tap port and, in response, the controller device 550 can turn off the tap port.

In some embodiments, the cable modem 560 can be used to generate two pilot signals, a low-frequency signal and a high-frequency signal, in order to determine loss at the plant including a DGA, such as DGA 400. The pilot signals can be used to balance the plant. To that point, the cable modem 560 can send those pilot signals to the plant to determine a loss. The controller device 550 can determine a tilt—e.g., a difference in loss between high-frequency signal and low-frequency signal. The controller device 550 can then adjust the tilt of the active tap 440. Specifically, the controller device 550 can cause the switch module 530 to equalize tilt by adjusting power at output at each tap port functionally connected to the active tap.

In some embodiments, the switch module 530, the controller device 550, and the cable modem 560 can be integrated in a chipset and faceplate having a particular form factor. The form factor can be specific to the frequency band of operation of the cable network that includes the active tap 440.

The controller device 550 includes at least one processor and at least one memory device. The at least one processor can execute machine-accessible instructions encoded or otherwise embedded in the at least one memory device. In response to execution of the such instructions, the controller device 550 can perform the monitoring and control of individual tap ports as is described herein.

Figure 7:
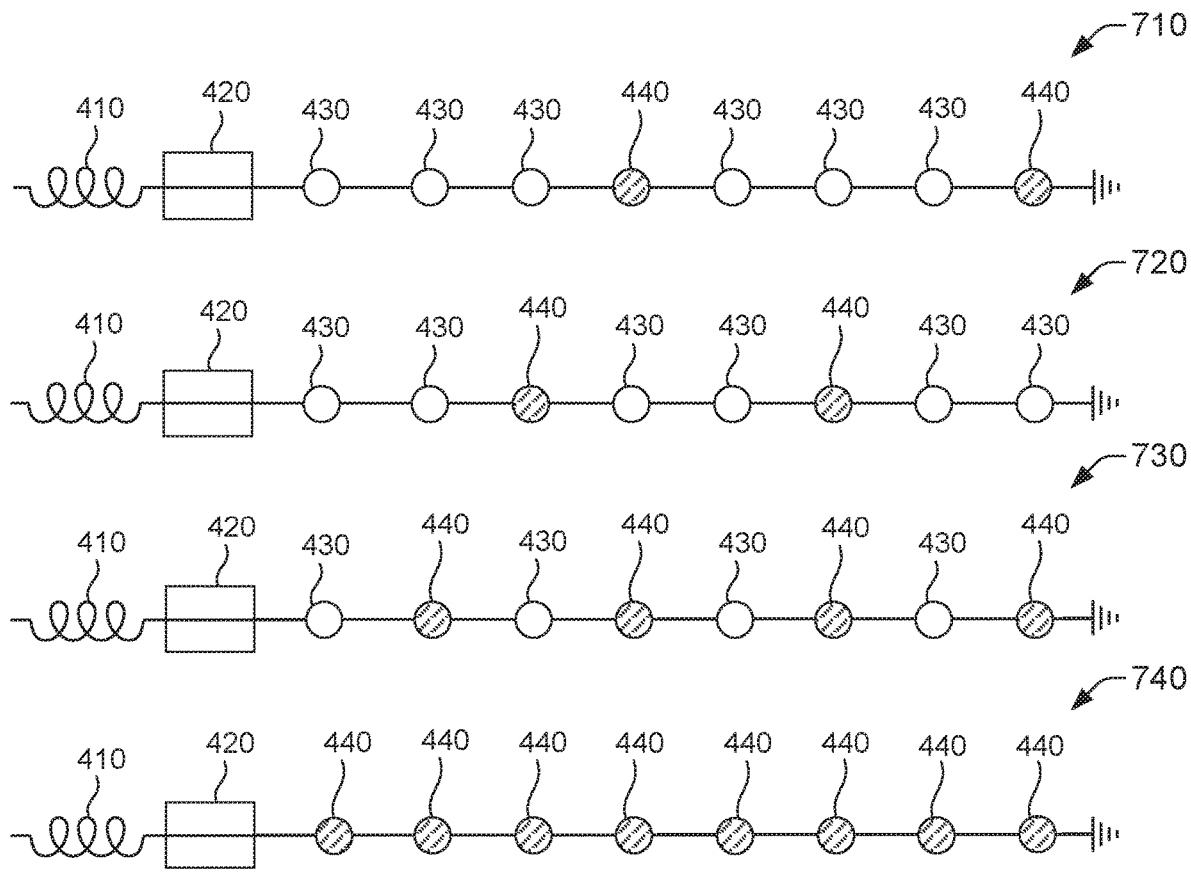
FIG. 7 presents examples of a cable network utilizing various distributed gain architectures, in accordance with one or more embodiments of this disclosure.

FIG. 7 presents examples of a cable network utilizing various distributed gain architectures, in accordance with one or more embodiments of this disclosure. The proportion of active taps 440 relative to passive taps 430 can be specific to the frequency band of operation of the cable network that utilizes a DGA. Such a proportion represents a filling factor of the active taps; namely, the filling factor corresponds to the ratio between the number of active taps 440 ($N_a$) and the total number of taps $N_a+N_p$ in the DGA. Here, $N_p$ represents the number of passive taps 430 in the DGA. Different arrangements of active-taps and passive taps can yield a same filling factor. The filling factor can be a parameter in the design of a cable network deployment.

The DGA 710 and the DGA 720 both have a filling factor equal to 0.25. A distance between consecutive active taps 440 in the DGA 710 is greater than that distance in the DGA 670. The arrangement of active taps 440 in the DGA 720 can be used when the cable network operates in a frequency band $\Delta f_2$ greater than a frequency band $\Delta f_1$ corresponding to the DGA 710. As an example, $\Delta f_1$ can be approximately 1.2 GHz and $\Delta f_2$ can be 1.8 GHz. The DGA 730 has a filling factor equal to 0.5. A distance between consecutive active taps 440 in the DGA 730 is less than that distance in the DGA 720. The arrangement of active taps 440 in the DGA 730 can be used when the cable network operates in a frequency band $\Delta f_3$ greater than $\Delta f_2$. As an example, $\Delta f_2$ can be approximately 1.8 GHz and $\Delta f_3$ can be 3 GHz.

The DGA 740 has a filling factor equal to unity—only active taps 440 are deployed. Such an architecture may be adequate, for example, in situations in which the cable network operates in a frequency band $\Delta f$ greater than the respective frequency bands of DGA 610, DGA 620, and DGA 630. The DGA 740 also can be utilized in cable networks that operate in any frequency band $\Delta f$, irrespective of the magnitude of $\Delta f$.

Figure 8:
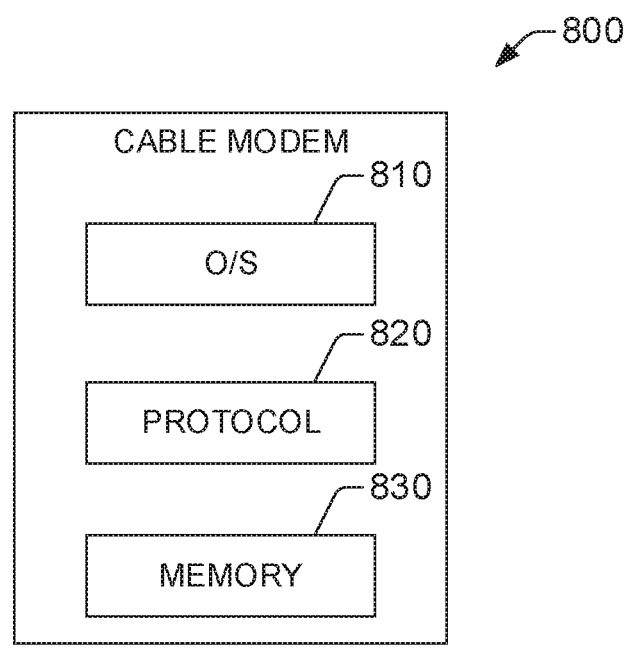
FIG. 8 presents an example of a cable modem, in accordance with one or more embodiments of this disclosure.

FIG. 8 presents an example of a cable modem 800, in accordance with one or more embodiments of this disclosure. The cable modem 800 includes an operating system 810. In an aspect, the operating system 810 may include any suitable operating system, such as a Linux or a Unix operating system. The cable modem 800 also can include one or many protocols 820 (referred to as protocol 820). The protocol 820 can include any suitable standard. For example, the protocol 820 can conform with DOCSIS and, thus, can include at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification. The protocol 820 also can permit the cable modem to communicate wirelessly with an external device.

In addition, the cable model 810 also includes one or more memory devices 830 (generically referred to as memory 830. In particular, the memory 830 can retain data from measurements and/or results representative of performance metrics in accordance with this disclosure. In addition, or in some configurations, the memory 830 can retain pilot signals to detect and/or transmit.

In some embodiments, the cable modem 810 can include processor(s) (not depicted in FIG. 8) to communicate with a controller device (e.g., controller device 550 (FIG. 6)) or other devices on a cable network, or both. The processor(s) also can perform signal modulation and similar functions. As mentioned, the processor(s) may be embodied in one or several complex programmable logic devices (CPLDs), microprocessors, multi-core processors, coprocessing entities, application-specific instruction-set processors (ASIPs), microcontrollers, and/or controllers. Further, the processor(s) may be embodied as one or more other processing devices or circuitry. In addition, or in some embodiments, the processor(s) can be embodied in integrated circuits, application specific integrated circuits (ASICs), field programmable gate arrays (FPGAs), programmable logic arrays (PLAs), hardware accelerators, other circuitry, and/or the like.

Figure 9:
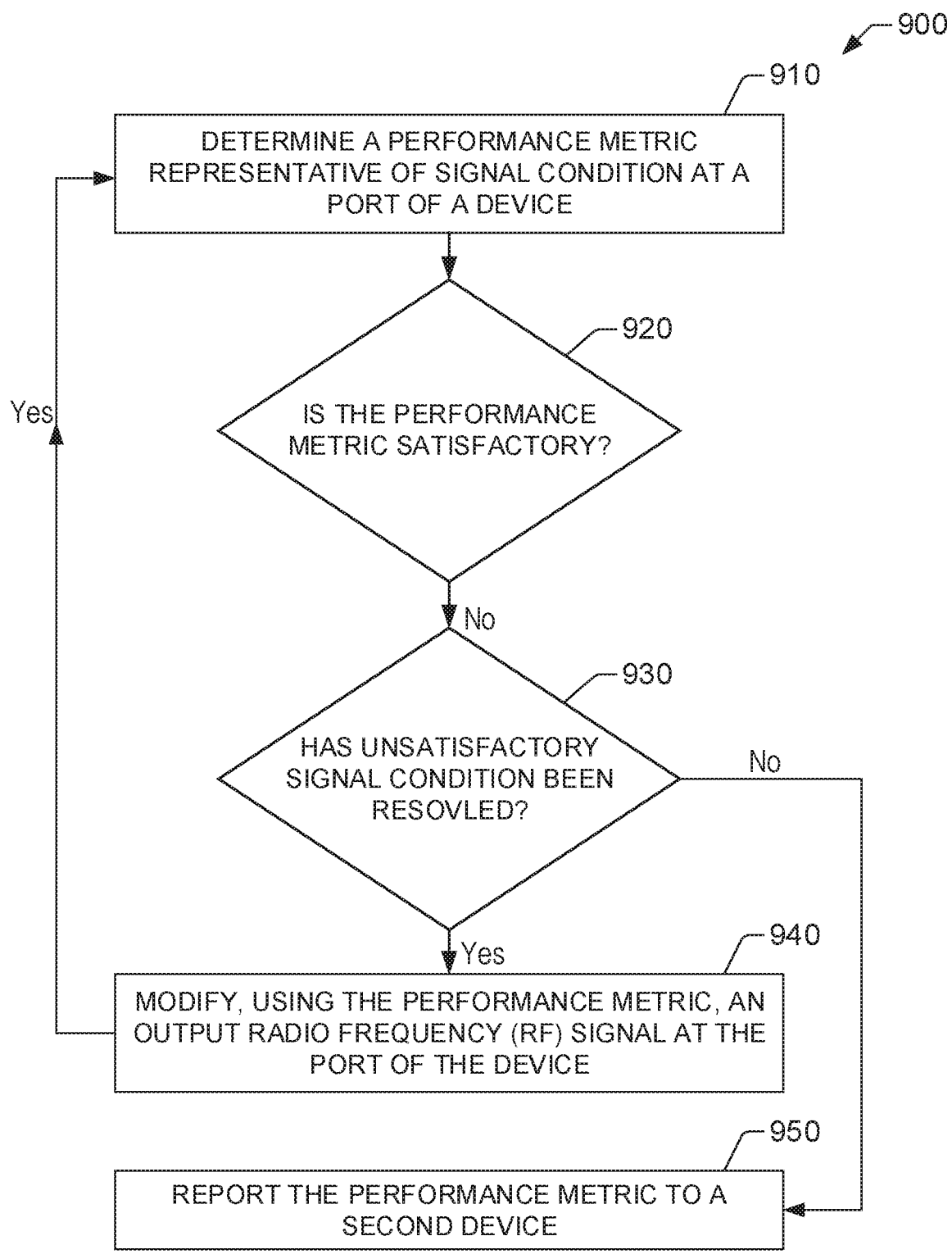
FIG. 9 presents an example of a method for monitoring and controlling signal condition at an active tap, in accordance with one or more embodiments of this disclosure.
Figure 10:
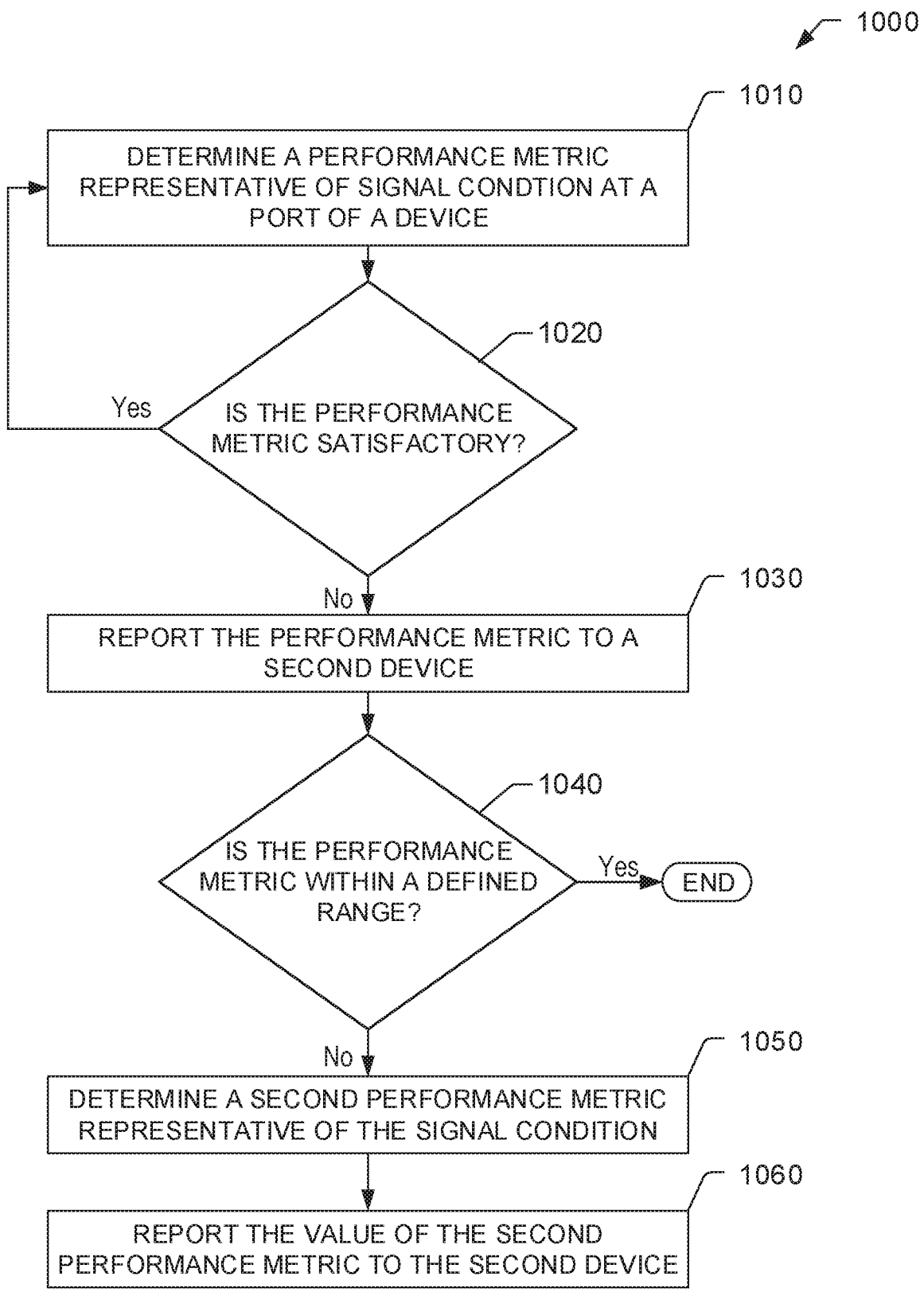
FIG. 10 presents an example of a method for monitoring signal condition at an active tap, in accordance with one or more embodiments of this disclosure.

Other examples of the techniques that can be implemented in accordance with this disclosure can be better appreciated with reference to FIG. 9 and FIG. 10. For purposes of simplicity of explanation, the exemplified methods in FIG. 6 and FIG. 10 (and other techniques disclosed herein) are presented and described as a series of operations. It is noted, however, that the exemplified method and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

Techniques disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the techniques disclosed herein. The programming code instructions, when executed by the one or more processors can implement or carry out the various operations in the exemplified methods and/or other technique disclosed herein.

The programming code instructions, therefore, provide a computer-executable or machine-executable framework to implement the exemplified methods and/or other techniques disclosed herein. More specifically, yet not exclusively, each block of the flowchart illustrations and/or combinations of blocks in the flowchart illustrations can be implemented by the programming code instructions.

FIG. 9 presents an example of a method for monitoring and controlling signal condition at a device, in accordance with one or more embodiments of this disclosure. The device can be an active tap in accordance with this disclosure. For instance, the device can be the active tap 440 illustrated in FIG. 5. The example method 900 can be performed, entirely or partially, by a processing device (e.g., controller device 550). The processing device can be integrated into the device. In some embodiments, the processing device can be embodied in the controller device 550 (FIG. 5). The processing device includes or is functionally coupled to one or more processors, one or more memory devices, other types of computing resources, a combination thereof, or the like. Such processor(s), memory device(s), and computing resource(s), individually or in a particular combination, permit or otherwise facilitate implementing the example method 900. The computing resources can include operating systems (O/Ss); software for configuration and/or control of a virtualized environment; firmware; central processing unit(s) (CPU(s)); graphics processing unit(s) (GPU(s)); virtual memory; disk space; interface(s) (I/O interface devices, programming interface(s) (such as application programming interfaces (APIs), etc.); controller devices(s); power supplies; a combination of the foregoing; or the like.

At block 910, the processing device can determine a performance metric representative of signal condition at a port of the device. Determining the performance metric includes determining a magnitude of the performance metric.

At block 920, the processing device can determine if the performance metric is satisfactory. To that end, the processing device can determine if the magnitude of the performance metric satisfies a threshold criterion (e.g., the magnitude is greater than or equal to a threshold value, or the magnitude is less than the threshold value). The performance metric is satisfactory when the magnitude of the performance metric satisfies the threshold criterion. In response to determining that the performance metric is satisfactory, flow can continue to block 910, where the processing device can continue determining the performance metric. Thus, the processing device can monitor the signal condition in real-time.

In some situations, the processing device can determine that the magnitude of the performance metric fails to satisfy the threshold criterion. The performance metric and the signal condition are thus deemed unsatisfactory. As a result, the flow can proceed to block 930, where the processing device can determine if the unsatisfactory condition is to be resolved. In response to determining that the unsatisfactory signal condition is to be resolved, flow continues to block 940. At such a block, the processing device can modify, using the magnitude of the performance metric, an output RF signal at the port of the device. Modifying the output RF signal can include causing an RF switch module (e.g., module 530 in FIG. 5) to reduce or increase an amplitude of the output RF signal based on the magnitude of the performance metric.

In response to determining that the unsatisfactory signal condition is not to be resolved, flow continues to block 950, wherein the processing device can report the performance metric to a second device. To that end, in some embodiments, the processing device can cause a cable modem integrated into the device to send data defining the magnitude of the performance metric to the second device. The second device can be, for example, a network device remotely located relative to the device. The network device can be an active tap, a headend device, a management device, or similar. In addition, or in other embodiments, the processing device can cause the cable modem to send such data to a user device (e.g., a field engineer device in proximity to the device).

FIG. 10 presents an example of a method 1000 for monitoring signal condition at a device, in accordance with one or more embodiments of this disclosure. The device can be an active tap in accordance with this disclosure. For instance, the device can be the active tap 440 illustrated in FIG. 5. The example method 1000 can be performed, entirely or partially, by a processing device (e.g., controller device 550). The processing device can be integrated into the device. In some embodiments, the processing device can be embodied in the controller device 550 (FIG. 5).

At block 1010, the processing device can determine a performance metric representative of signal condition at a port of the device. Determining the performance metric includes determining a magnitude of the performance metric.

At block 1020, the processing device can determine if the performance metric is satisfactory. To that end, the processing device can determine if the magnitude of the performance metric satisfies a threshold criterion (e.g., the magnitude is greater than or equal to a threshold value, or the magnitude is less than the threshold value). The performance metric is satisfactory when the magnitude of the performance metric satisfies the threshold criterion. In response to determining that the performance metric is satisfactory, flow can continue to block 1010, where the processing device can continue determining the performance metric. Thus, the processing device can monitor the signal condition in real-time.

In response to determining that the performance metric is unsatisfactory, flow continues to block 1030, where the processing device can report the performance metric to a second device. To that end, in some embodiments, the processing device can cause a cable modem integrated into the device to send data defining the magnitude of the performance metric to the second device. The second device can be, for example, a network device remotely located relative to the device. As mentioned, the network device can be an active tap, a headend device, a management device, or similar. In addition, or in other embodiments, the processing device can cause the cable modem to send such data to a user device.

At block 1040, the processing device can determine if the performance metric is within a defined range. In response to determining that the performance metric is within the defined range, no further monitoring or reporting is performed. In the alternative, in response to determining that the performance metric is outside the defined range, flow can proceed to block 1050. At block 1050, the processing device can determine a second performance metric representative of the signal condition. Determining the second performance metric includes determining a magnitude of the second performance metric.

At block 1060, the processing device can report the second performance metric to the second device. To that end, in some embodiments, the processing device can cause the cable modem integrated into the device to send data defining the magnitude of the second performance metric to the second device.

By performing block 1050 and block 1060, a particularly anomalous condition can be further characterized. Additional information that is provided on such a condition can be used for root-cause analysis or another type of diagnostics, or both.

Although examples of processing systems have been described above, implementations of the technologies and related functional operations of this disclosure can be implemented in other types of digital electronic circuitry, or in computer software, firmware, or hardware, including the structures disclosed in this specification and their structural equivalents, or in combinations of one or more of them.

Embodiments of the technologies and related functional operations of this disclosure can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources For purposes of illustrations, a data processing apparatus encompasses all kinds of apparatus, devices, and machines for processing data, including by way of example a programmable processor, a computer, a system on a chip, or multiple ones, or combinations, of the foregoing. The data processing apparatus can include special purpose logic circuitry, for example an FPGA (field programmable gate array) or an ASIC (application-specific integrated circuit). The data processing apparatus also can include, in addition to hardware, program code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or program code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output information/data. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or send information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or integrated in, special purpose logic circuitry.

To provide for interaction with a user, embodiments of the subject matter described herein can be implemented on a computer having a display device, for example a CRT (cathode ray tube), LCD (liquid crystal display), or LED (light emitting diode) based monitor, for displaying information/data to the user and a keyboard and a pointing device, for example a mouse or a trackball, by which the user can provide input to the computer. Other kinds of devices can be used to provide for interaction with a user as well. For example, feedback provided to the user can be any form of sensory feedback, for example visual feedback, aural feedback, or haptic feedback; and input from the user can be received in any form, including acoustic, speech, or tactile input. In addition, a computer can interact with a user by sending documents to and receiving documents from a device that is used by the user. For example, by sending web pages to a web browser on a user's client device in response to requests received from the web browser.

Embodiments of the technologies disclosed herein can be implemented in a computing system that includes a backend component, for example as an information/data server, or that includes a middleware component, for example an application server, or that includes a frontend component, for example a client computer having a graphical user interface or a web browser through which a user can interact with an implementation of one or several of the technologies disclosed herein, or any combination of one or more such backend, middleware, or frontend components. The components of the computing system can be interconnected by any form or medium of digital information/data communication, for example a communication network. Examples of communication networks include a local area network (LAN) and a wide area network (WAN), an inter-network (for example the Internet), and peer-to-peer networks (for example ad hoc peer-to-peer networks).

The computing system can include client devices and server devices. A client device and a server device are generally remotely located relative to one another and typically interact through a communication network. The relationship of client and server arises by virtue of computer programs running on the respective computers and having a client-server relationship to each other. In some embodiments, a server device transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be ~xcised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the technologies of this disclosure have been described. Other embodiments are within the scope of the following claims. In some cases, the actions recited in the claims can be performed in a different order and still achieve desirable results. In addition, the processes depicted in the accompanying FIGS. do not necessarily require the particular order shown, or sequential order, to achieve desirable results: In certain implementations, multitasking and parallel processing may be advantageous.

Many modifications and other embodiments of the technologies set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   determining, by a processing device comprising at least one processor, first data indicative of a radio-frequency (RF) signal at a tap port functionally coupled to a customer premises equipment (CPE), the processing device being integrated into a cable network tap device having multiple tap ports including the tap port;
   determining, by the processing device, using the first data, a first magnitude of a performance metric associated with a signal attribute;
   determining, by the processing device, that the first magnitude satisfies a threshold criterion;
   receiving, by the processing device, second data indicative of a second RF signal at the tap port;
   determining, by the processing device, using the second data, a second magnitude of the performance metric associated with the signal attribute;
   determining that the second magnitude fails to satisfy the threshold criterion; and
   causing a switch module to modify an output RF signal at the first tap port.

2. The method of claim 1, further comprising,
   determining, by the processing device, that the second magnitude is outside a defined range;
   determining, by the processing device, a magnitude of a second performance metric associated with a second signal attribute; and
   providing second data associated with the magnitude of the second performance metric to a network device.

3. The method of claim 1, wherein providing the second data comprises causing, by the processing device, a cable modem to send the second data to a network device, the cable modem integrated into the cable network tap device.

4. The method of claim 3, wherein sending the second data comprises using proactive network maintenance (PNM) messaging in accordance with data over cable service interface specification (DOCSIS).

5. The method of claim 3, further comprising providing the second data to a user device, wherein providing the second data comprises causing the cable modem to send data indicative of the second magnitude to user device, the data sent using a short-range radio protocol.

6. The method of claim 1, wherein modifying the output RF signal comprises one of:
   reducing a transmit power of the output RF signal at the tap port by a first defined amount based on the second magnitude, or
   increasing the transmit power of the output RF signal at the tap port by a second defined amount based on the second magnitude.

7. The method of claim 1, wherein determining that the second magnitude fails to satisfy the threshold criterion further comprises determining that the second magnitude exceed a defined threshold value, and
   wherein modifying the output RF signal comprises reducing a transmit power of the output RF signal at the tap port to zero by disconnecting the tap port to an energized line within cable network tap device.

8. The method of claim 1, wherein modify the output RF signal at the first tap port further comprises modify an amplitude of the RF signal.

9. A computing device, comprising:
   at least one processor; and
   at least one memory device having computer-executable instructions encoded thereon that, in response to execution by the at least one processor, cause the computing device to:
   receive first data indicative of a radio-frequency (RF) signal at a tap port functionally coupled to a customer premises equipment (CPE), the tap port assembled in a cable network tap device comprising multiple tap ports and the computing device;
   determine, using the first data, a first magnitude of a performance metric defining a signal attribute;
   determine that the first magnitude satisfies a threshold criterion;
   receive second data indicative of a second RF signal at the tap port; and
   determine, using the second data, a second magnitude of the performance metric associated with the signal attribute;
   determine that the second magnitude fails to satisfy the threshold criterion; and
   cause a cable modem to send data associated with the second magnitude to a network device remotely located relative to the computing device, the cable modem integrated into the cable network tap device.

10. The computing device of claim 9, wherein sending the second data comprises using proactive network maintenance (PNM) messaging in accordance with data over cable service interface specification (DOCSIS).

11. The computing device of claim 9, wherein further execution of the computer-executable instructions further causes the computing device to cause the cable modem to send data associated with the second magnitude to user device, the data sent using a short-range radio communication protocol.

12. The computing device of claim 9, wherein further execution of the computer-executable instructions further causes the computing device to:
   determine that the second magnitude fails to satisfy the threshold criterion; and
   cause a switch module to modify an output RF signal at the tap port, the switch module integrated into the cable network tap device.

13. The computing device of claim 12, wherein modifying the output of the RF signal at the tap port comprises one of:
   reducing a transmit power of the output RF signal at the tap port by a first defined amount based on the second magnitude, or
   increasing the transmit power of the output RF signal at the tap port by a second defined amount based on the second magnitude.

14. A system, comprising:
   a first tap device comprising:
      multiple ports including a first port configured to receive radio-frequency (RF) signals from a customer premises equipment (CPE);
      a switch module functionally coupled to the first port; and
      a controller device configured to operate the switch module, the controller device further configured to:
         receive first data indicative of a first RF signal of the RF signals from the CPE;
         determine, using the first data, a first magnitude of a performance metric defining a signal attribute;
         determine that the first magnitude satisfies a threshold criterion;
         receive second data indicative of a second RF signal of the RF signals from the CPE;
         determine, using the second data, a second magnitude of the performance metric defining the signal attribute;
         determine that the second magnitude fails to satisfy the threshold criterion; and
         cause a switch module to modify an output RF signal at the first tap port.

15. The system of claim 14, wherein the first tap device further comprises a cable modem, and wherein the controller device is further configured to:
   cause the cable modem to send data defining the second magnitude to a network device remotely located relative to the first tap device, wherein sending the data defining the second magnitude comprises using proactive network maintenance (PNM) messaging in accordance with data over cable service interface specification (DOCSIS).

16. The system of claim 14, further comprising a second tap device functionally coupled to the first tap device by means of at least a coaxial line, the second tap device including:
   multiple second ports including a port configured to receive radio-frequency (RF) signals from a second CPE;
   a second switch module functionally coupled to the port; and
   a second controller device configured to operate the second switch module, the second controller device further configured to:
      receive first data indicative of a first RF signal of the RF signals from the second CPE;
      determine, using the first data, a third magnitude of the performance metric defining a signal attribute;
      determine that the third magnitude satisfies the threshold criterion;
      receive second data indicative of a second RF signal of the RF signals from the second CPE; and
      determine, using the second data, a fourth magnitude of the performance metric defining the signal attribute.

17. The system of claim 16, wherein the second tap device further comprises a second cable modem, and wherein the second controller device is further configured to:
   determine that the fourth magnitude fails to satisfy the threshold criterion; and
   cause the second cable modem to send data defining the fourth magnitude to a network device remotely located relative to the second tap device, wherein sending the data defining the fourth magnitude comprises using proactive network maintenance (PNM) messaging in accordance with data over cable service interface specification (DOCSIS).

18. The system of claim 16, wherein the second tap device further comprises a second switch module, and wherein the second controller device is further configured to:
   determine that the fourth magnitude fails to satisfy the threshold criterion; and
   cause the switch module to modify an output RF signal at the port.

19. The system of claim 16, wherein each one of the first tap device and the second tap device operates in a defined frequency band spanning approximately 1.2 GHz, approximately 1.8 GHz, or approximately 3 GHz.

20. The system of claim 14, wherein modify the output RF signal at the first tap port further comprises modify an amplitude of the RF signal.

* * * * *